United States Patent [19]

Cook

[11] 4,011,158

[45] Mar. 8, 1977

[54] OIL-WATER SEPARATION PROCESS AND APPARATUS

[75] Inventor: Danny G. Cook, Walnut Creek, Calif.

[73] Assignee: Liquid Processing Systems, Inc., San Leandro, Calif.

[22] Filed: May 23, 1975

[21] Appl. No.: 580,537

Related U.S. Application Data

[63] Continuation-in-part of Ser. No. 465,168, April 26, 1974, abandoned.

[52] U.S. Cl. .......................... 210/23 R; 210/242 S; 210/259; 210/DIG. 5; 210/DIG. 25
[51] Int. Cl.[2] ........................................ B01D 13/00
[58] Field of Search ............ 210/23 R, DIG. 5, 242, 210/307, 308, 310, 256, 260, 262, 259

[56] References Cited

UNITED STATES PATENTS

| 2,048,140 | 7/1936 | Renfrew et al. | 210/307 X |
|---|---|---|---|
| 2,328,027 | 8/1943 | Muller | 210/242 R X |
| 3,703,463 | 11/1972 | Bhuta et al. | 210/23 R |

FOREIGN PATENTS OR APPLICATIONS

| 243,501 | 12/1925 | United Kingdom | 210/23 |

Primary Examiner—Frank A. Spear, Jr.
Attorney, Agent, or Firm—Flehr, Hohbach, Test, Albritton & Herbert

[57] ABSTRACT

A system for removing oil from an oil-water dispersion such as in bilge water to form an effluent of high purity. At least one container for a coalescing medium (e.g., resin particles) is positioned in the interior of an upright reservoir wall and includes a liquid permeable lower wall in a frusto-conical shape in contact with water in the reservoir. The dispersion is directed through the coalescing medium wherein small oil droplets coalesce into larger ones which float to the surface of the aqueous reservoir to form a floating oil layer on the water. Purified water flows out from the lower portion of the reservoir in a radially outward direction from the coalescing medium container thereby reducing the water flow rate. Prior to flow through the coalescing medium, the dispersion is optionally passed into a holding tank wherein material heavier than water is settled for periodic removal of heavy contaminants. Pitch accommodating means is provided to adapt the system to ship board use. With a floating open bottomed reservoir wall and coalescing medium container, the system can be floated on a body of water with the purified water flowing out the bottom of the reservoir.

10 Claims, 8 Drawing Figures

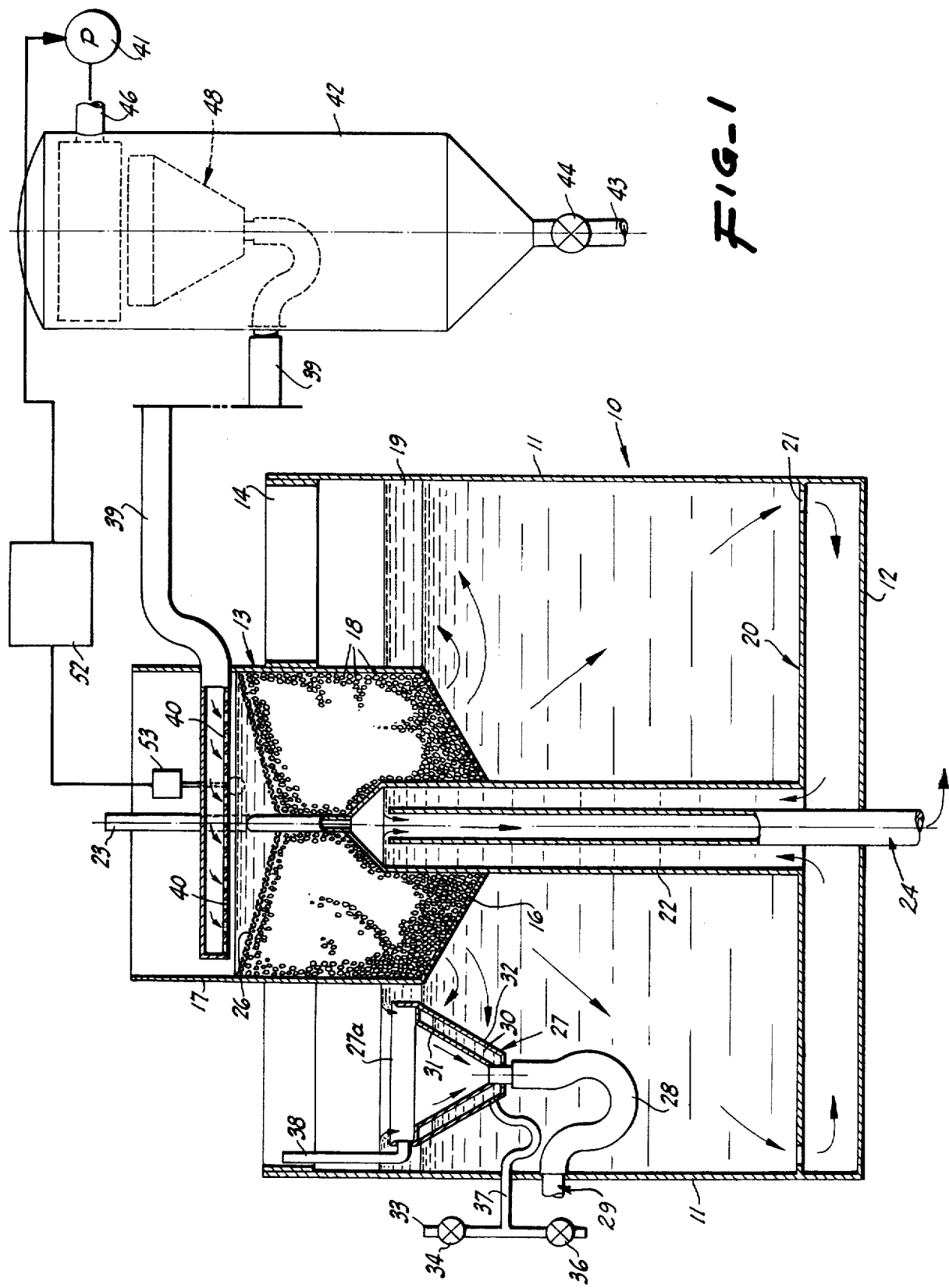

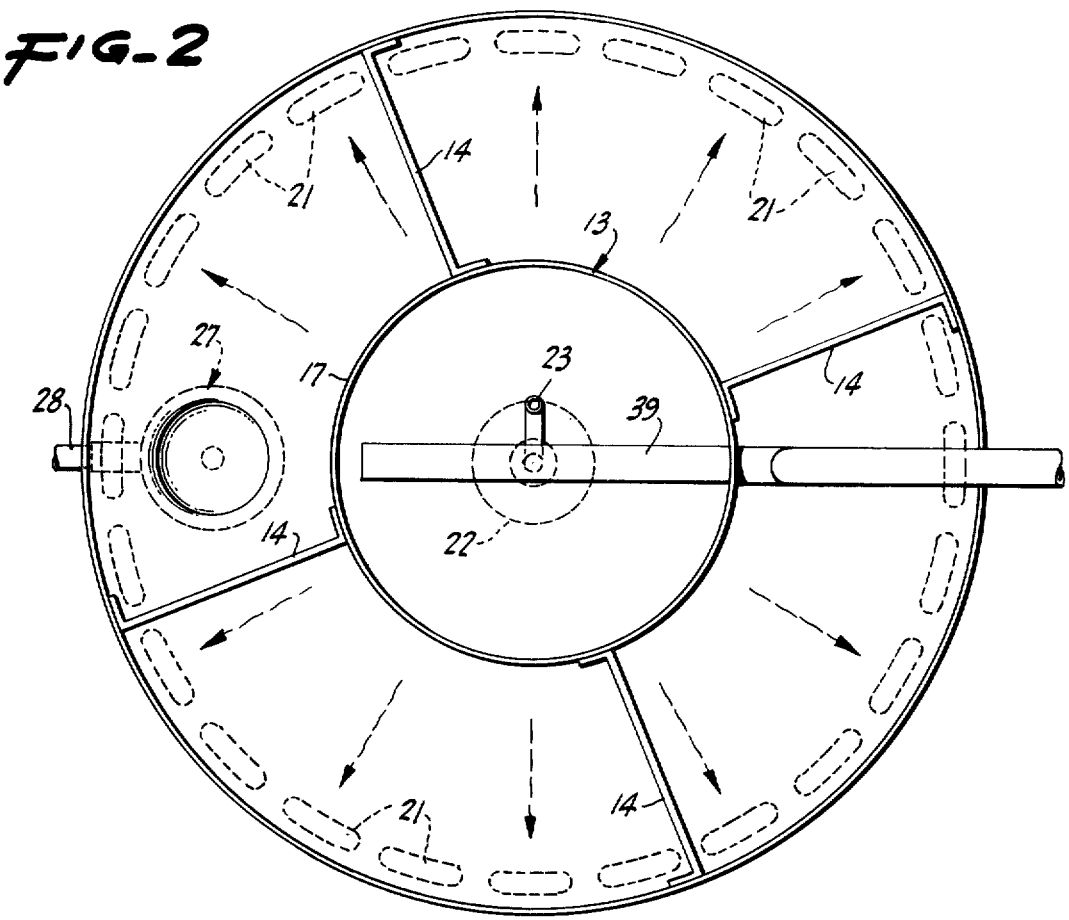
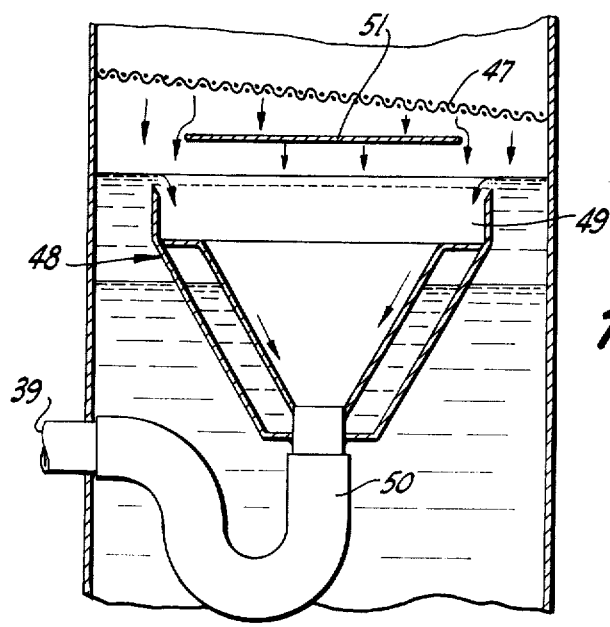

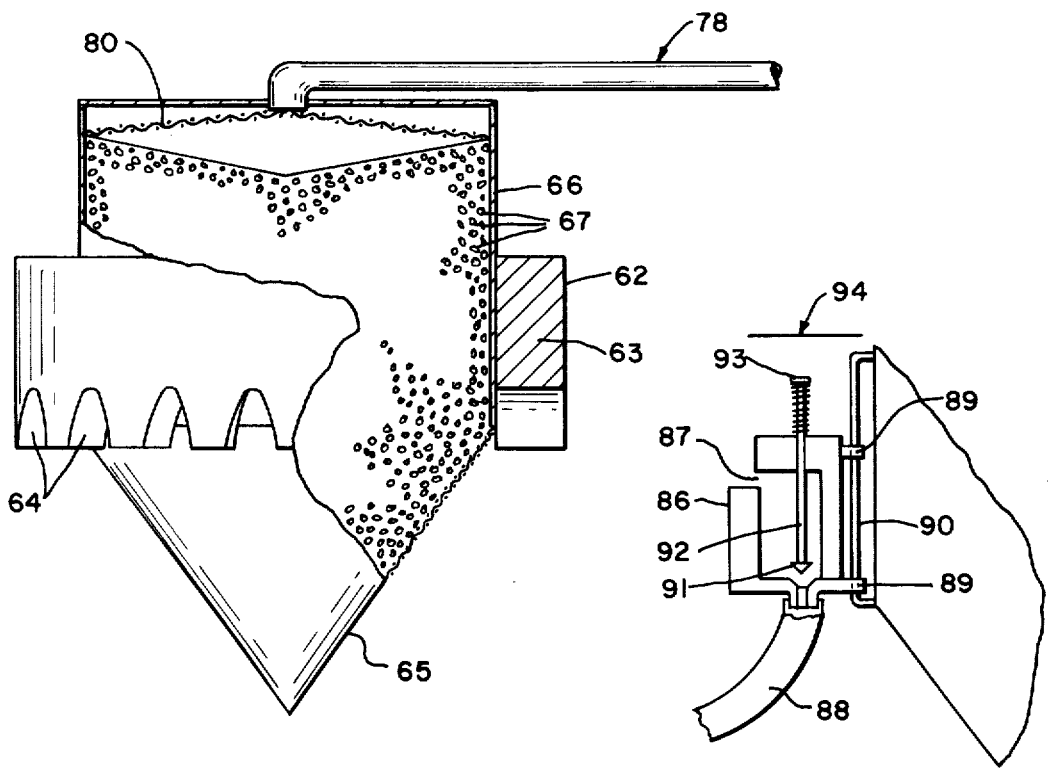
FIG.—7
FIG.—4
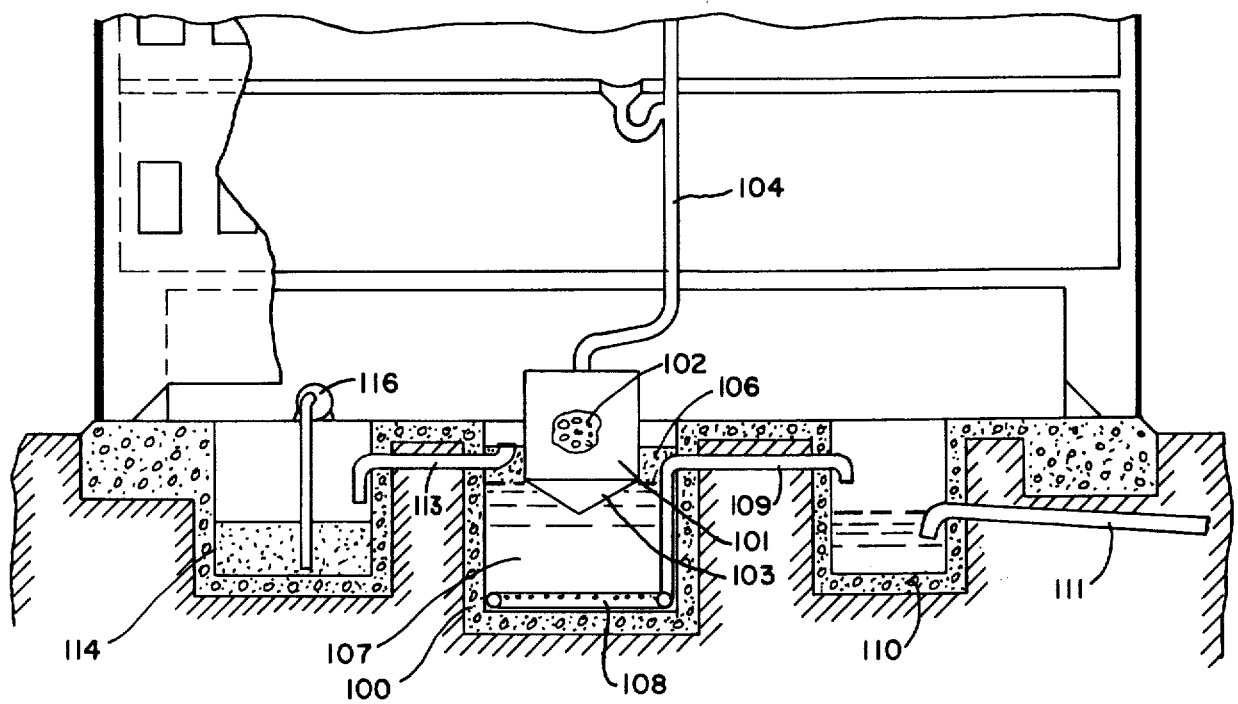
FIG.—8

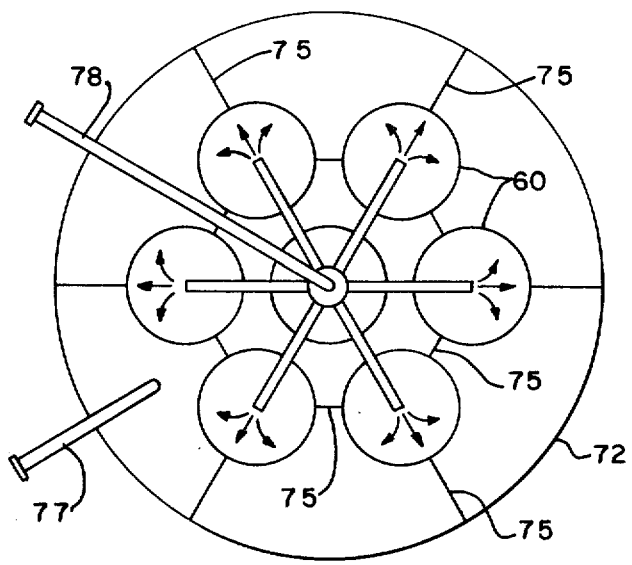
FIG.—5
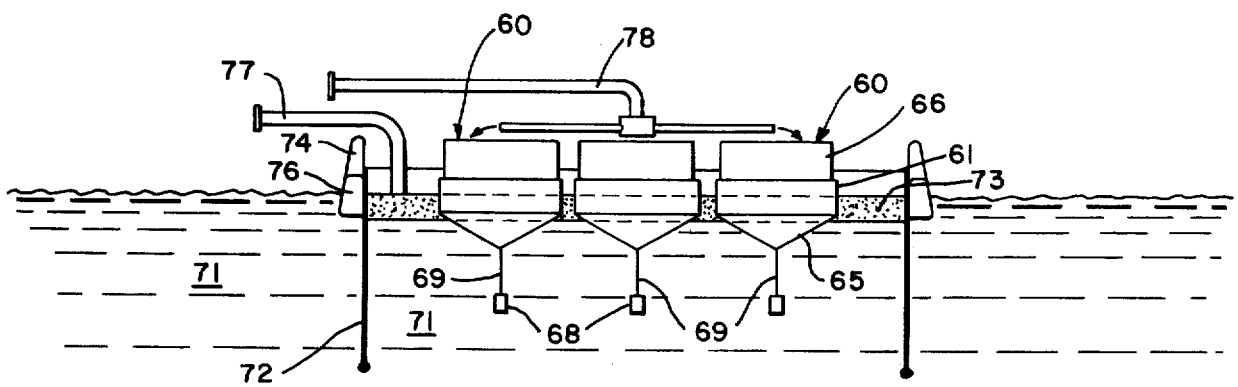
FIG.—6

4,011,158

OIL-WATER SEPARATION PROCESS AND APPARATUS

CROSS-REFERENCE TO RELATED APPLICATIONS

This application is a continuation-in-part of co-pending application Ser. No. 465,168, filed Apr. 26, 1974 now abandoned. Reference is also made to application Ser. No. 519, 751, filed Oct. 31, 1974, a continuation-in-part of application Ser. No. 465,169, filed Apr. 26, 1974 now abandoned.

BACKGROUND OF THE INVENTION

The present invention relates to a method of coalescing and separating oil from a dispersion of oil in water.

The standards are rapidly increasing for the purity level of contaminated water released from a ship or barge into port areas and other bodies of water. There is a particular problem in purifying large quantities of bilge water containing significant quantities of oil. At the present time, one standard commonly used in the United States is that the purity is unacceptable if a visible plume of oil is detected in discharged bilge water. This corresponds to an oil content in the water of on the order of 10 parts per million (ppm).

A particular problem is presented in the discharge of ballast from ships and barges in that in many port areas a ship cannot be safely maneuvered into docking if the ballast is discharged out of port. Accordingly, it is necessary for the discharge to occur in port. Because conventional systems have not been developed for removing sufficient quantities of oil from the ballast water on board the ships (e.g., tankers) or barges, service companies have been developed which will receive pumped ballast water and remove the oil in permanent land-based installations of high capital outlay. This is relatively expensive to the ship or barge owners.

To date, no satisfactory system has been developed for purifying ballast and other bilge water capable of use directly on board ship or in an inexpensive floating system to meet the stringent discharge standards of the United States ports.

A number of systems have been employed for the removal of oil from a dispersion of oil in water. One such system employs granules of plastic materials such as polyethylene and polytetrachloroethylene as a bed through which the dispersion is passed. The oil droplets tend to coat the resin particles and it is necessary to periodically regenerate the resin particles as by shutting down the system and passing a solvent for the oil through the particles. This is quite costly and time consuming. In addition, no known system utilizing such resin particles has been known to produce the types of purities required for the discharge of bilge water at ports of high effluent standards. Furthermore, it is not believed that any such systems have been adapted to shipboard use to accomodate the pitching and rolling of even moderate seas.

SUMMARY OF THE INVENTION

It is a general object of the present invention to provide a system for the separation of oil in water which is economical to install and operate and which overcomes the deficiencies of prior art systems.

It is a particular object of the invention to provide a system of the above type suitable for use on board ship.

It is another object of the invention to provide a system capable of purifying an oil-water dispersion to a high quality at an economically feasible flow rate.

It is a further object of the invention to provide a system of the above type in which the oil separated from the dispersion is concentrated sufficiently for economic recovery of the oil content therein.

It is another object of the invention to provide an inexpensive oil-water separation system capable of independent floating on a body of water.

In accordance with the above objects, one apparatus particularly suitable for the separation of oil from a dispersion of oil in water includes means forming a reservoir with a lower liquid outlet means and a coalescing tank disposed centrally of the reservoir means. The tank includes a liquid permeable lower wall, preferably of inverted frusto-conical shape, through which coalesced oil flows which forms a floating oil phase in the reservoir.

Upstream of the reservoir, settling means may be provided for removing liquid heavier than water prior to feeding to the coalescing tank. This means includes a primary tank and means for removing liquid from an upper region of the same in communication with the liquid supply means. An outlet is provided in the lower region in the primary tank for periodically removing the heavy liquid contaminants.

A number of features render one embodiment of the present system particularly well adapted for ship board use. The purified water outlet may include a stand pipe which accomodates pitching and rolling. Also skimming means for the reservoir floating oil phase is flexibly supported to float in the oil phase to accomodate sudden pitching of the reservoir means without disruption.

In another embodiment, the system is floated on a body of water without an enclosing reservoir tank. One or more coalescing tanks of the above type are provided with flotation collars for floating in a body of water, as a harbor. Reservoir means comprising a flotably supported open bottomed reservoir wall or curtain surrounds the coalescing tanks. After passage through the coalescing tank, the oil coalesces into an oil phase floating on a water phase formed of the separated water. The flow of dispersion forces the reservoir water out the opening of the reservoir wall, typically under the curtain, to mix with the water body.

Each of the methods for carrying out purification with the above systems takes advantage of common known scientific phenomena. Firstly, the system is operated so as to form a laminar floating phase of oil above the liquid of the reservoir. Also, a head space of air or other gas preferably is provided above the coalescing oil layer in the reservoir to assist in the coalescing action. To provide laminar flow, the purified water preferably is withdrawn from the reservoir at a radially outward direction from the coalescing zone for deceleration of flow at withdrawal to thereby minimize turbulence.

Briefly summarized, in a preferred embodiment, the method comprises passing the dispersion through a coalescing zone suitable formed of a coalescing medium such as halogenated polyethylene granules supported by a generally conical liquid permeable wall. A reservoir of liquid is formed around the coalescing zone by the liquid passing through the liquid permeable wall in a manner that a gas head space is maintained above the liquid reservoir. The flow conditions are controlled to form a quiescent laminar floating layer of oil in the upper region of the liquid reservoir. Oil is skimmed from this layer while purified water is withdrawn from a lower region of the reservoir. Where there are any substantial quantities of liquids or solids heavier than water in the dispersion to be treated, it is preferable to subject the dispersion to settling and preliminary heavy liquid removal in a primary tank as set forth above prior to passage to the reservoir.

Additional objects and features of the invention will appear from the following description in which the preferred embodiments of the invention have been set forth in detail in conjunction with the drawings.

BRIEF DESCRIPTION OF THE DRAWINGS

FIG. 1 is a schematic representation of one embodiment of the present system.

FIG. 2 is a top view of the reservoir portion of the present system.

FIG. 3 is a side view partially in section of the holding tank portion of the present system.

FIG. 4 is a schematic view of an oil skimming device suitable for use in the system of FIG. 1.

FIG. 5 is a top schematic view of a floating embodiment of the present invention.

FIG. 6 is a side view of FIG. 5 wih the reservoir wall broken away.

FIG. 7 is an enlarged side view partially broken away of a floating coalescing tank for use in the embodiment of FIG. 5.

FIG. 8 is a schematic side cross-sectional view of another embodiment.

DETAILED DESCRIPTION OF THE PREFERRED EMBODIMENTS

In general, the present system is capable of removing oil from an oil-water dispersion to yield a highly purified water by promoting the coalescing of small oil droplets into larger ones which have a significantly increased tendency to rise into a floating oil layer at the surface of a reservoir of the liquid. The water is removed from below the reservoir at low flow velocities to permit the coalesced droplets to separate from the water and rise into the floating oil layer. The separation is further enhanced by maintaining the oil layer in a quiescent state in contact with air which has preferential affinity for the oil.

One system suitable for carrying out the separation from an oil-water dispersion according to the present invention is schematically illustrated in FIGS. 1-3 of the present drawings. Means forming a reservoir is provided in the form of tank 10 having a cylindrical sidewall 11 and a flat bottom wall 12.

A coalescing medium container 13 is centrally disposed in tank 10 and suitably mounted to sidewall 11 by spaced mounting arms 14. Container 13 includes a liquid permeable lower wall 16 mounted to a cylindrical upstanding sidewall 17 at its outer end and to an outlet assembly to be described hereinafter at its inner end.

Lower wall 16 is sufficiently permeable to liquid flow therethrough so that such flow does not create any significant back pressure and is of sufficient strength to support coalescing medium 18. With coalescing medium 18 formed of particulate materials, the openings in wall 16 are smaller than the coalescing particles to prevent particle flow therethrough into tank 10. A suitable form of wall 16 is a screen or grid. For reasons that will be described hereinafter, wall 16 includes a sloping portion with a radially inwardly disposed lower end, preferably in the form of an inverted frusto-conical shape with a suitable apical conical angle on the order of 15° to 60°, preferably 25° to 30°.

Coalescing medium 18 serves to promote the attraction of separate small oil droplets into larger ones which have a greater propensity than the original smaller ones to float to the surface of a body of liquid and become a part of or form independently a floating oil layer therein. One suitable coalescing medium is in the form of granules, on the order of 0.10 to 0.30 inch nominal diameter or larger, in the shapes of pellets, beads or irregular pieces.

The upper portion of the resin bed is preferably in the configuration of a radially inwardly sloping surface such as an inverted cone. To maintain the granules in the desired fixed position, a screen 26 is positioned over the top of the coalescing bed. This favors the initial oil coalescing at the outer periphery of the resin bed in an annular or donut-like shape. Thus, when the dispersion passes into tank 10, a high concentration of coalesced oil is adjacent to a floating laminar oil phase of layer 19 for ready contact and incorporation into the layer. In the illustrated system layer 19 is disposed in the annular region between tank 10 and coalescing medium container 13.

In a preferred form of the invention granules of halogenated polymer of an alpha-monoolefin monomer, especially brominated polyethylene, are utilized as the coalescing medium. This material is suitably formed by bromination of the polyethylene either in a dry state or in an organic solvent. A detailed description of this preferred coalescing medium and its method of formation is fully set forth in my co-pending application entitled "Halogenated Resin and Method for Forming", U.S. Ser. No. 465,169, filed Apr. 26, 1974. As set forth in said application, passage through the brominated polyethylene granules causes the small oil droplets to coalesce into larger ones and bypass the polymer granules without substantially coating them. Thus, these granules are particularly well suited for use over extended periods of time without frequent regeneration by oil removal.

Other types of particulate coalescing media may be employed formed from such materials such as Teflon (polytetrafluoroethylene), polyethylene, polypropylene, polyvinyl chloride, polyvinylidene chloride or their copolymers. These materials are not so effective as the above preferred polymers since they tend to become coated and so require periodic cleaning. However, they are acceptable for use in the present system where the quantity of oil is not high enough to require shut-down of service with undue frequency.

A lower liquid outlet means is disposed at the lower region of tank 10 and serves to remove the purified water at a sufficient depth to provide separation from floating oil phase 19. The illustrated outlet means comprises a plate 20 mounted across the lower region of tank 10 including circumferentially spaced openings 21 adjacent to the outer periphery of the plate.

An important feature of the present invention is that the liquid flow into and out of tank 10 is controlled to be in the laminar region so as to avoid the creation of turbulence. This increases the efficiency of the separation of the oil into a floating phase 19. By positioning outlet openings 21 radially outward from container 13, the velocity of flow of the purified water from the tank is reduced. For this purpose, it has been found that a ratio of the cross-sectional area of container 13 to that of a cross-section bounded by openings 21 of 1:4 provides an excellent rate of deceleration of liquid removal through openings 21 and a consequent increase in the efficiency of separation of oil into the floating oil layer. The only outer limit of this ratio is one of practicality in that the tank should be small enough for ship board use. A smaller ratio such as 1:2 may be employed although efficiencies are somewhat reduced. It is suitable for the ratio to be at least greater than 1:1. It is apparent that for a minimum size of tank 10 and a maximum efficiency of deceleration of the liquid removal, openings 21 should be disposed relatively close to side wall 11. Also, by limiting the size of openings 21 deceleration is further assisted.

To adapt the present device to ship board use, the lower liquid outlet means includes pitch accomodating means comprising a conduit 22 centrally disposed in the reservoir and extending upwardly above a predetermined liquid level desired for the reservoir. As illustrated in FIG. 1, the conduit extends through lower wall 16, coalescing medium 18 and out of the liquid in container 13 to provide communication via an air vent portion 23 with the atmosphere.

An outlet pipe 24 is disposed concentrically within conduit 22 and suitably mounted to bottom wall 12 of tank 10. The upper openings of pipe 24 is at a level on the order of the predetermined liquid level in tank 10 while the lower openings project out of the tank for discharge. It is apparent that the above pitch accommodating means will not flood out and will provide a constant level of liquid in the tank regardless of the amount of pitching and rolling on board the ship. The liquid in tank 10 is maintained at an approximately constant level governed by the elevation of the upper openings of outlet pipe 24.

Means is provided for skimming liquid from the upper portion of the liquid in tank 10 comprising a floating skimmer housing 27, suitably of conical shape for stable floating, mounted to side wall 11 by flexible tubing 28. The tubing provides communication between the interior of skimmer housing 27 and the exterior of tank 10 and is sealed against leakage by coupling with rigid pipe 29 mounted into sidewall 11. Means is provided for adjusting the floating level of skimmer 27 sufficiently below the upper surface of the oil to permit the oil to flow from the tank while maintaining an approximately constant thickness of the oil layer for a given oil density. Thus, if there is a sudden surge or increase in the oil content of the water, the floating nature of the skimming means accomodates this surge and is capable of more rapidly removing the oil from the tank while maintaining a high purity of discharge. Suitable adjusting means comprises a hollow ballast chamber 30 defined by inner and outer walls 31 and 32 of skimmer housing 27. A water line 33 flowing in the direction of the arrow includes valves 34 and 36 surrounding tubing 37 tapped between the valves at one end and communicating with the interior of chamber 30 at the other end. When it is desired to increase the density of the skimmer housing, valve 34 is opened and valve 36 is closed to fill the ballast chamber. Valve 34 is closed when the desired amount of water flows into the chamber. To lighten the housing, valve 34 is closed and valve 36 is opened. To avoid air pressure build-up in the ballast chamber, an air vent 38 communicates between the chamber and surrounding air.

Means is provided for supplying liquid to the upper surface of the coalescing medium 18 and comprises conduit 39 with multiple openings 40 to disperse the liquid to be treated in a uniform manner over the medium. The liquid supply means includes pumping means 41 communicating with the upstream side of the conduit 39. It is preferable that pumping means 41 be of a non-homogenizing, continuous pressure pump type such as a conventional screw type pump. For optimum efficiency, pulsating or pressure pumps such as the centrifugal or gear type are to be avoided since they tend to create turbulence in the influent liquid which more intimately mixes the oil and water and makes the oil more difficult to coalesce and separate.

An optional system for removing liquid or solids heavier than water is illustrated in FIGS. 1 and 3 of the drawings and comprise a generally cylindrical primary tank 42 having a conical bottom terminating in an outlet line 43 which, in turn, includes a flow valve 44. Pumping means 41 serves to supply water to primary tank 42 through inlet pipe 46. It is preferable that the pumping means be upstream of the primary tank to minimize turbulence on the downstream side. Screen 47 serves to remove solid materials from the dispersion which might otherwise interfere with the system. It may be tilted to concentrate the solids to prevent clogging and to provide a means of continuous solids removal.

Also, a baffle or umbrella 51 is disposed above the top of floating cup 49 so that the liquid supply to the primary tank 42 is prevented from falling directly into floating cup 49.

A floating wier type of skimming means 48 is disposed in primary tank 42 similar to the one in tank 10. Briefly described, it includes a floating cup 49 connected by flexible tubing 50 in a liquid tight seal to the upstream end of conduit 39 which is sealingly engaged with the sidewall of the primary tank. Tubing 50 provides liquid communication between the interior of cup 49 and the upstream end of conduit 39. The weight of cup 49 and tubing 50 together with the flexibility of the last named tubing and the elevation of the same are adjusted in combination to permit the cup to float just below the upper liquid level in tank 42 to provide a steady flow over the rim of the cup into conduit 39 to serve as the liquid supply to coalescing medium container 13. The floating level is not as critical as for skimming housing 27 and so external level adjusting means is not important.

Primary tank 42 serves to collect heavy solids and certain liquid fractions, both oil and non-oil, heavier than water which sink to the bottom of the primary tank. These liquids can be periodically discharged by opening valve 44 and letting them flow out pipe 43. Without primary tank 42 or some comparable device for removing liquid heavier than water, this liquid would flow through the coalescing medium container 13 and out of openings 21 along with the water to provide a possible source of contamination. By use of the primary tank 42, the separation in tank 11 is primarily limited to an oil fraction which is lighter than water. An important function of primary tank 42 is the atmospheric interfacial surface tension spreading effect of oil spreading on the surface of the water in contact with air.

Another function of tank 42 is that the velocity of the liquid supplied thereto as from the bilge of the ship is substantially reduced because of the volumeric differential of pipe 46 to tank 42. In fact, the liquid supplied to coalescing medium 18 via pipe 39 can be arranged to flow by gravity to further reduce this velocity. Thus, the primary tank assists in minimizing turbulence which in turn minimizes the mixing effect of agitation which could otherwise adversly affect the efficiency of the system.

A flow limiting device 52 may be provided to maintain a constant liquid level above the coalescing medium. This is desirable to prevent large increases in the liquid level in container 13 under surge flow which would create a pressure head and consequent increased liquid flow into tank 11 leading to increased turbulence and mixing with a detrimental effect on oil coalescing. One suitable flow limiting device 52 interconnects a suitable float valve 53 and pump 41 whereby when the float is raised above a predetermined maximum level, pump 41 is automatically either deactivated or decelerated. In similar manner, when the float drops below the predetermined liquid level, the pump would either by reactivated or accelerated.

The following method of the present invention is carried out using the above-described system. An oil-water mixture, such as bilge or ballast water utilized in a ship, is pumped into the system by pumping means 41, preferably with a non-homogenizing non-pulsating type.

In a first optional settling step, the liquid is pumped into a primary tank 42 to remove liquids or solids heavier than water. The liquid first passes through a screen 47 for the removal of solid materials. Thereafter, the liquid is allowed to fall onto the surface of the body of liquid around the exterior of floating cup 49 and is prevented from flowing directly into cup 49 by baffle 51. By providing a sufficient residence time, liquids heavier than water together with small heavy particulate matter which passes through screen 47 are permitted to settle onto the lower conical portion of tank 42. Valve 44 is periodically opened to remove such heavy contaminants.

Liquid is skimmed from the upper region of the primary tank into floating cup 49 and is introduced via conduit 39 as the feed material in the physical coalescing zone of the process. Because pumping means 41 is at the upstream side of the primary tank and the liquid is maintained in the tank for a sufficient period of time for settling of heavier materials, liquid flow through conduit 39 can be controlled at a relatively low velocity without undue turbulence. This increases the efficiency of the process by minimizing the mixing of the oil and water. For this smooth laminar flow, the conduit between the primary tank and the coalescing zone should be maintained under gravity flow conditions.

After the optional settling steps, the dispersion is passed downwardly through an enclosed physical coalescing zone suitably comprising coalescing medium 18 disposed above a lower liquid permeable wall 16. The liquid level in the physical coalescing zone is preferably maintained just above the coalescing medium. As set forth above, the medium, suitably a particulate bed of granules of a halogenated polymer of an alpha-monoolefin (preferably brominated polyethylene), is formed in a conical shape with a downwardly disposed apex. This configuration together with the maintenance of an air head space directly above the liquid in the coalescing zone assists separation of liquid in a donut-like layer. The maintenance of an air head space directly above skimming means 48 takes advantage of the preferential affinity of air for oil rather than water.

That is, the surface tension created by the air interface aids in the surface spreading of droplets of oil lighter than water into a continuous more easily recoverable film at the air-water interface. As explained below, it is preferable to form as much of the coalesced material to the outer periphery of the physical coalescing zone so that it contacts or is immediately adjacent to floating oil phase 18 in tank 11. The conical configuration contributes to this objective because of the affinity for oil noted above. Thus, the oil immediately begins to coalesce at the interface of the upper portion of the resin and the air overhead located at the resin periphery.

The effect of the brominated polyethylene has been shown to be one of coalescing or forming the oil droplets into larger ones rather than a coating of the oil on the resin particles. It is believed that this phenomenon occurs because of the dipolar nature of the resin which enables it to break down the charges of the individual oil particles which are otherwise repelled by each other. This principle is fully described in my co-pending application as referred to above.

A reservoir of liquid is formed about the physical coalescing zone from coalesced oil passing through the liquid permeable wall 16. As set forth above, the flow of liquid through the wall is preferably maintained in the laminar region and every effort is made to minimize turbulence.

One way of minimizing turbulence is by preventing substantial pressure drops which could otherwise agitate the liquid. One technique set forth above to accomplish this is to regulate the level of liquid in the coalescing zone at a constant relatively shallow depth regardless of surges in influent liquid flow. This minimizes the pressure head and hence the liquid flow rate through wall 16.

Another way in which the turbulence through wall 16 is minimized is by facilitating the oil path to the floating oil layer. This is accomplished by forming the wall so that the oil enters the reservoir at increasing depths in a radially inward direction. A preferred configuration to accomplish this is to form the wall into a frusto-conical shape. In this way, a major portion of the oil which has coalesced in the coalescing medium has an easy path along the lower surface of the conical wall. Any oil build-up along the wall can slide into direct contact with the floating oil phase which is preferably at a depth adjacent to the upper end of the lower permeable wall and in contact therewith. Thus, water is not required to force its way through an oil layer of substantial thickness which tends to create turbulence and decrease the efficiency of agglomeration of the oil particles. This is accomplished by substantially sloping the lower wall at a conical angle $\epsilon$ of say 60° or less between an element of the cone and a line through the vertex. The vertex should not be so deep in tank 10 that oil droplets are close to openings 21 as to be drawn therethrough. Also, the liquid pressure head at increasing depths tends to compress the oil droplets which interfere with the coalescing action. For a practical tank depth, conical angle $\epsilon$ is greater than 15°.

A quiescent laminar floating layer of oil is formed in the upper region of the liquid reservoir in the annular space between tank 11 and coalescing medium container 13. As coalesced relatively large droplets of oil emerge into the reservoir they are attracted to laminar floating oil phase 19. As the size of emerging particles increase, this attraction likewise increases for more complete separation. Thus, by floating the oil phase slightly below the liquid permeable lower wall 16, direct contact is established with a substantial portion of the coalesced oil proceeding through the resin bed. It is preferable to establish a floating oil phase prior to start-up as the purest water is recovered when a significant floating layer of oil is pre-established. As set forth above, for highest efficiency, a gaseous head space (e.g., air) is maintained above the liquid reservoir to take advantage of the well known surface tension effect causing spreading of the oil when in contact with gas. An inert gas may be employed instead of air if, for example, the reservoir is enclosed and fumes of oil would create an explosion hazard when mixed with air.

Oil is skimmed continuously from the floating oil phase by means of a suitable skimming device of the type set forth above. The principle of the floating skimming device is that it provides a floating wier for removing the oil in a sheering action from the top of the floating layer without disturbing the quiescent state of the oil.

Purified water is withdrawn from a lower region of the reservoir at a radially outward distance from coalescing medium container 13. This enables deceleration of flow from permeable wall 16 as it proceeds outwardly to the water outlet to thereby minimize turbulence. The above system is most efficient where the coalescing zone is disposed centrally of the reservoir and many lower liquid outlets 21 are disposed uniformly about the periphery of cylindrical plate 20. In this arrangement, flow in a radial direction is uniformly decelerated.

The purified water withdrawn through openings 21 is thereafter directed upwardly through conduit 22 and overflows into outlet pipe 24 for final discharge. In this arrangement, the floating oil phase 19 is maintained at a constant level controlled by the height of outlet pipe 24 regardless of the degree of pitching and rolling which might occur if it were placed aboard a ship.

The oil outlet from tank 10 by skimming means 27 it self-adjusting to the level of the oil in the container. This also accomodates pitching and rolling as might occur on board a ship. It is understood that other adjustable skimming systems may be employed.

The size of the granules in the particulate bed and the depth of the bed are determined by the proportion of oil to water in the influent liquid and by the desired flow rates. If the coalescing medium is formed of small particles, this leads to relatively high pressure drops, if the bed is of any depth, which would disturb the desired laminar flow. On the other hand, smaller particles serve to increase the coalescing effect. As set forth above, suitable particles might be on the order of 0.1 to 0.3 inches or larger in nominal diameter. Suitable bed depths may vary from 6 inches or more to 72 inches or less depending upon the oil concentrations of the influent liquid.

A typical through-put in the system is on the order of 3 gallons per minute per square foot of surface area in the coalescing medium. This flow may be increased to a level on the order of 6 gallons or decreased to a level on the order of 1 gallon per minute.

The present system can be used for dispersions in which the oil concentration in water varies over a wide range to as high as 99% by weight of the dispersion to a low of 0.0001% (1 ppm).

An example follows of carrying out the above method on an apparatus as illustrated in FIG. 1 with the elimination of optional primary tank 42. The influent liquids were oil mixtures including bunker fuel, diesel oil fuel, light lubricating oils, kerosene, turbine oil and the like. The concentration of oil in the influent liquids ranges from about 99% to 0.0001% by weight. The diameter of tank 10 is 12 inches and coalescing medium container 13 is 6 inches. The depth of the resin is 6 inches. The liquid flow rate was on the order of 0.5 gallons per minute. At the end of the test 50 gallons of clear liquid were collected in a water effluent drum containing impurities at a level no greater than about 5 parts per billion (0.005 ppm) of oil.

It is an important ecomonic advantage of the above system that the oil is separated in a sufficiently concentrated form for recovery and commercial use.

In another embodiment of the invention, illustrated in FIGS. 5, 6, and 7, the system is floated directly on a body of water, such as a harbor or bay, without the use of an enclosing reservoir tank. A plurality, in this instance, seven of the oil coalescing medium containers 60 are floated on the body of water. Suitable flotation means is carried by each container comprising flotation collars 61. The collars suitably include housing wall 62 with interior lightweight bouyant material 63 such as multiple air cells formed of a foamed polymer or the like. Collar 61 may also include floating level stabilization means comprising spaced undercut areas 64 which causes more of bouyant material 63 to be placed in contact with the water as the overall density of the container increases in comparison to the body of water. In this manner, as the container sinks into the water, it becomes more bouyant. Another feature of collars 64, not shown, in that they may be adjustably mounted to accomodate flotation in either fresh or salt water. One means to accomplish this is to provide a flange connection on the collar which is mounted at the desired flotation level onto spaced reinforcing ribs on containers 60.

Containers 60 include a liquid permeable lower wall 65 mounted to cylinder upstanding sidewall 66 at its outer end. Suitable coalescing medium comprising granules 67 are disposed in container 60. The foregoing description of such coalescing medium and lower wall are also applicable to this floating embodiment. Stabilizers, such as pendulum weights 68, are suitably mounted by support wires 69 to the apex of the bottom walls of each of containers 60 to stabilize the same against excessive tilting in rough waters. The tanks are anchored in spaced apart position by guide wires 75.

Containers 60 are floated on an aqueous water reservoir 70 initially formed of water from the surrounding body of water 71. An oil layer 73 floats on the reservoir 70. Means for defining aqueous reservoir 70 is provided comprising upright continuous reservoir wall 72. In the illustrated embodiment, wall 72 comprises an oil retaining hanging curtain weighted at the bottom for stability and including a ring or loop 74 to retain the wall in a generally cylindrical shape. Reservoir wall 72 surrounds floating containers 60 and is suitably formed of a flexible material such as a polyester coated fabric sold under the trademark "Hypalon" by DuPont. Wall 72 hangs at a sufficient depth, e.g., 20 to 30 feet, so that any oil droplets entrained in the water can float upwardly into floating oil layer 73 rather than under the retaining wall. Suitable flotation means is carried by reservoir wall 72 for floating support on the body of water. In the illustrated embodiment, a flotation collar 76 is mounted onto retainer ring 74. Wall 72 serves to retain the coalesced floating oil layer 73 within its confines for removal by suitable means such as a suction pipe 77 from an oil collecting container.

The oil-water dispersion is fed in essentially equal quantities to each of containers 60 suitably by distribution line 78. The multiple containers are employed as they are more efficient where relatively large volumes of oil-water dispersion are to be treated. In a typical system, each of the illustrated seven resin tanks are approximately 20 feet in diameter and the reservoir wall is 100 feet in diameter. This system is suitable for the treatment of 10,000 gallons per minute of ballast water from a ship.

Means is provided below the outlet of distribution line 78 and above the coalescing medium for providing an even distribution of the oil-water dispersion over the surface of the coalescing medium and suitably comprises perforate circular baffle plate 80.

The principles of operation of the above system are generally the same as set forth with respect to the embodiment of FIGS. 1-3. The upper surface of floating oil layer 73 is maintained in contact with the surrounding air during flow of the oil-water dispersion through containers 60 as the layer builds up to take advantage of the atmospheric interfacial surface tension spreading effect described above. Such air-oil contact is not as important if a starting oil layer is floated on the surface rather than allowing it to build up from the oil coalescing after passing through coalescing tanks 60.

In operation of the above system, it is advantageous to maintain the flow rate of the dispersion through the bed of granules in container 60 at a level below that at which the bed is completely flooded. In this manner, the coalescing effect of the granules is assisted by the presence of air in the bed in direct contact with the dispersion layer on the granules. For this purpose, it is perferable to maintain the level of oil-water dispersion in containers 60 below the upper surface of the granules.

Any oil droplets entrained in the water flowing through coalescing containers 60 tend to rise to the interior of reservoir wall 72 and to coalesce with floating oil layer 73. With ballast water as the oil-water dispersion, the liquid typically is warmer than the surrounding body of water (e.g., harbor or bay), particularly if the hold of the ship has been "Butterworthed", i.e., cleaned with a hot water spray. This warmer water tends to stratify beneath the floating oil layer to assist rise of the droplets within the reservoir wall before this warm water is urged below the reservoir wall into contact with the surrounding body of water.

Referring to FIG. 4, another embodiment of an oil outlet means for withdrawing oil from the oil layer is illustrated which is suitable for use in an enclosed tank on board a ship. The device includes a skimming house 86 defining an inlet opening 87 which is maintained slightly below the upper surface of the floating oil layer in the tank. An oil outlet line 88 is mounted to the lower portion of housing 86. The housing is flotably mounted suitably by guide rings 89 mounted to the housing and slidably received by guide rail 90 mounted to the coalescing medium container or tank. An automatic shut-off valve is provided to prevent water from flowing through outlet line 88 if the ship pitches or rolls in turbulent waters to a sufficient extent that the water level rises to opening 87. Such means comprises a plug 91 spring mounted to a piston rod 92 with an upper contact surface 93 adjacent the top wall 94 of the reservoir tank. Upon excessive tilting of the tank, surface 93 contacts the reservoir top wall and forces plug 91 downwardly to close off flow in line 88.

Referring to FIG. 8, an embodiment is illustrated suitable for use in washing an oil containing surface with water. Such a system might be used to collect the waste liquid from washing the floor of a plant upon which oil has leaked or the grid or floor of an airport or car wash where oil is present. In the embodiment of FIG. 8, the present system is disposed in the basement of a building provided with an oil-water drainage system. A reservoir 100 is form cast in concrete in the basement. A container 101 including coalescing medium 102 includes a perforated bottom wall 103 as set forth above. Oil is supplied to the upper surface of the container through a floor drainage collection pipe 104. As the dispersion passes through container 101, it forms a floating oil layer 106 upon an aqueous reservoir 107. Water is withdrawn at a radially outward distance through perforate circular pipe 108 at the bottom of the aqueous reservoir and flows through outlet pipe 109 into a clean water tank 110 and from there through line 111 to sewage. Oil is collected from floating layer 106 and flows through outlet pipe 113 into oil sump 114. The oil is suitably recovered from the oil sump by an oil recovery pump 116. It is apparent that this system does not require the pitch accommodating means of FIGS. 1-3 as it does not operate on shipboard.

It is apparent from the foregoing that a method and apparatus for the separation of oil from a dispersion of oil in water has been provided capable of economically removing oil to produce water at a high degree of purity. This system operates on the principle that oil can be coalesced in a coalescing medium and separated into a floating layer of oil on top of an aqueous reservoir. The invention is predicated upon taking all effective measures to eliminate turbulence and reduce flow rates through the coalescing portion of the system to greatly increase the efficiency of the separation.

What is claimed is:

1. A method for the separation of oil from a dispersion of oil in water comprising:
   a. forming an enclosed physical oil coalescing zone comprising an oil coalescing medium disposed above a lower liquid permeable wall,
   b. disposing and coalescing zone above an aqueous reservoir so that said reservoir forms a continuous water phase in contact with said liquid permeable wall,
   c. forming an oil layer floating above and in contact with said water phase,
   d. passing said dispersion downwardly through said oil coalescing zone into said reservoir through said permeable wall at increasing depths in a radially inward direction,
   e. maintaining said oil layer in a quiescent laminar condition in the upper region of said liquid reservoir,
   f. removing oil from the floating oil layer, and
   g. withdrawing purified water from the lower portion of said reservoir at a radially outward distance from said coalescing zone so that the flow of water continues in a downward direction from the coalescing zone outwardly until withdrawal causing the flow of water to decelerate along the outward path.

2. A method as in claim 1 in which a gas head space is maintained above said floating oil layer.

3. A method as in claim 1 in which the water level in the reservoir is adjacent the upper portion of said liquid permeable wall.

4. A method as in claim 1 in which said floating oil layer is at a level to contact a portion of the dispersion flowing through said coalescing zone permeable wall.

5. A method as in claim 1 in which said coalescing zone floats upon said aqueous reservoir.

6. A method as in claim 1 in which said oil coalescing medium comprises a particulate bed and the flow rate of said dispersion is below that at which said bed is completely flooded.

7. A system for the separation of oil from a dispersion of oil in water comprising:
 a. means for defining a reservoir including an upright continuous wall,
 b. a water reservoir disposed to the interior of said reservoir wall,
 c. at least one oil coalescing medium container having a liquid permeable lower wall and being disposed to the interior of said reservoir wall, said lower wall including a sloping portion with a radially inwardly disposed lower end,
 d. an oil coalescing medium disposed in said container,
 e. lower liquid outlet means disposed in a lower region of said reservoir defining means at a radially outward distance from said coalescing medium container so that the flow of water through said permeable lower wall continues in a downward direction from the coalescing zone outwardly until withdrawal causing the flow of water to decelerate along the outward path,
 f. an oil layer floating above and in contact with said water reservoir and between said reservoir wall and coalescing medium container,
 g. oil outlet means for withdrawing oil from said oil layer, and
 means for supplying an oil-water dispersion into the upper portion of said coalescing medium container.

8. A system as in claim 7 together with flotation means carried by said coalescing medium container for floating support of said container on the water reservoir.

9. A system as in claim 7 together with flotation means carried by said reservoir wall for floating support on a surrounding body of water, said reservoir means defining an open bottom capable of providing an outlet for said water reservoir.

10. A system as in claim 7 together with settling means disposed upstream of said liquid supply means for removing liquids or solids heavier than water comprising a primary tank, and means for removing liquid from an upper region of said primary tank in communication with said liquid primary means, and an outlet in the lower region of said primary tank.

* * * * *